United States Patent [19]
McNeely et al.

[11] Patent Number: 5,838,600
[45] Date of Patent: Nov. 17, 1998

[54] DC GAIN INVARIANT FILTER IMPLEMENTATION

[75] Inventors: David Lowell McNeely; Paul Gothard Knutson, both of Indianapolis, Ind.

[73] Assignee: Thomson Consumer Electronics, Indianapolis, Ind.

[21] Appl. No.: 912,795

[22] Filed: Aug. 18, 1997

[51] Int. Cl.$^6$ ....................................................... G06F 17/10
[52] U.S. Cl. ................................ 364/724.012; 364/724.16
[58] Field of Search ..................... 364/724.011, 724.012, 364/724.1, 724.16

[56] References Cited

U.S. PATENT DOCUMENTS

| | | | |
|---|---|---|---|
| 4,760,542 | 7/1988 | Mehrgardt et al. | 364/724.012 |
| 4,852,034 | 7/1989 | Takayama | 364/724.012 |
| 5,170,369 | 12/1992 | Rossum | 364/724.17 |
| 5,389,923 | 2/1995 | Iwata et al. | 341/61 |
| 5,610,942 | 3/1997 | Chen, et al. | 375/242 |
| 5,621,404 | 4/1997 | Heiss, et al. | 341/61 |

OTHER PUBLICATIONS

Baldwin, "Digital Standards Conversion", Digital Video/SMPTE, 1977, vol. 1, pp. 84–93.

Knutson, et al. "An Optimal Approach to Digital Raster Mapper Design", IEEE, May 91, pp. 72–73.

*Primary Examiner*—Chuong Dinh Ngo
*Attorney, Agent, or Firm*—Jeffrey D. Carter

[57] ABSTRACT

A filtering circuit suitable for use in a video sample rate converter provides a constant direct current (DC) gain irrespective of realization errors, and reduces hardware requirements. The circuit includes an input terminal for receiving an input signal. A first delay unit delays the input signal to generate a first delayed signal. A subtracting unit subtracts the input signal from the first delayed signal to generate a difference signal. A second delay unit delays the difference signal to generate a second delayed signal. A reference delay unit delays the first delayed signal by a predetermined reference time period to generate a reference signal. A filtering unit filters the second delayed signal to generate a filtered signal. An adding unit adds the reference signal to the filtered signal to generate an output signal. The circuit can be modified to include a multiplication unit for multiplying the input signal, the first delayed signal or the output signal by a given constant to obtain a desired direct current (DC) gain. According to at least one preferred embodiment, the filtering unit is constructed as a finite impulse response (FIR) filter. According to another embodiment, the filtering unit is constructed as an infinite impulse response (IIR) filter.

8 Claims, 6 Drawing Sheets

DC GAIN INVARIANT FILTER IMPLEMENTATION

FIELD OF THE INVENTION

The present invention generally relates to filter design, and more particularly, to a filter design that is capable of ensuring a constant desired direct current (DC) gain independent of realization errors under all input conditions with a minimal amount of hardware.

BACKGROUND OF THE INVENTION

In many video applications it is desirable to convert an electrical signal from one sampling rate to another, according to the format requirements of different devices. This type of conversion is required, for example, when translating video data streams from burst locked to line locked clocks, when time expanding or compressing data, and when implementing video features, such as zoom. In such a conversion, the input represents samples of a signal sampled on one grid, and the output represents different samples of the same signal sampled on a second grid. Polyphase filters are used to calculate data values for the signal at times other than the initial sampling times. This requires a separate filter for each sample sub-phase, or alternatively, a single time varying filter emulating the response required at each sample. Since component and composite sampling rates do not have simple integer ratios between the sampling frequencies, finite impulse response (FIR) filters, typically implemented in polyphase structure, are used to interpolate and decimate the input signal to achieve the desired sampling rate. When designing a video sample rate converter, it is essential that each individual filter state in the polyphase structure provide a constant direct current (DC) gain. Realization errors, however, can prevent a video sample rate converter from providing a constant direct current (DC) gain. Such realization errors may be attributable, for example, to the use of improper coefficient values, and/or problems with mathematical precision due to data path truncations and roundings. If a given filter state in the structure fails to provide a constant direct current (DC) gain, the resulting video image will exhibit artifacts that are undesirable to the viewer. The present invention has been contemplated in an effort to eliminate this potential problem while utilizing a minimal amount of hardware.

SUMMARY OF THE INVENTION

It is an object of the present invention to provide an improved filtering circuit that is suitable for implementation in a video sample rate converter useable in any video application, such as digital television.

It is another object to provide a design for a filtering circuit that ensures a constant direct current (DC) gain irrespective of realization errors.

It is still another object to provide a design for a filtering circuit that can be implemented with a minimal amount of hardware.

To achieve these and other objects, the present invention provides a filtering circuit having an input terminal for receiving an input signal. A first delay unit delays the input signal to generate a first delayed signal. A subtracting unit subtracts the input signal from the first delayed signal to generate a difference signal. A second delay unit delays the difference signal to generate a second delayed signal. A reference delay unit delays the first delayed signal by a predetermined reference time period to generate a reference signal. A filtering unit filters the second delayed signal to generate a filtered signal. An adding unit adds the reference signal to the filtered signal to generate an output signal. The circuit can be modified to include a multiplication unit for multiplying the input signal, the first delayed signal or the output signal by a predetermined constant to obtain a desired direct current (DC) gain. According to at least one preferred embodiment, the filtering unit is constructed as a finite impulse response (FIR) filter. According to another embodiment, the filtering unit is constructed as an infinite impulse response (IIR) filter.

The present invention also provides a filtering method that is initiated through the reception of an input signal. The input signal is delayed to generate a first delayed signal. The input signal is subtracted from the first delayed signal to generate a difference signal. The difference signal is delayed to generate a second delayed signal. The first delayed signal is delayed by a predetermined reference time period to generate a reference signal. The second delayed signal is filtered to generate a filtered signal. And, the reference signal is added to the filtered signal to generate an output signal. Either the first delayed signal, the input signal or the output signal can be multiplied by a predetermined constant to obtain a desired direct current (DC) gain.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
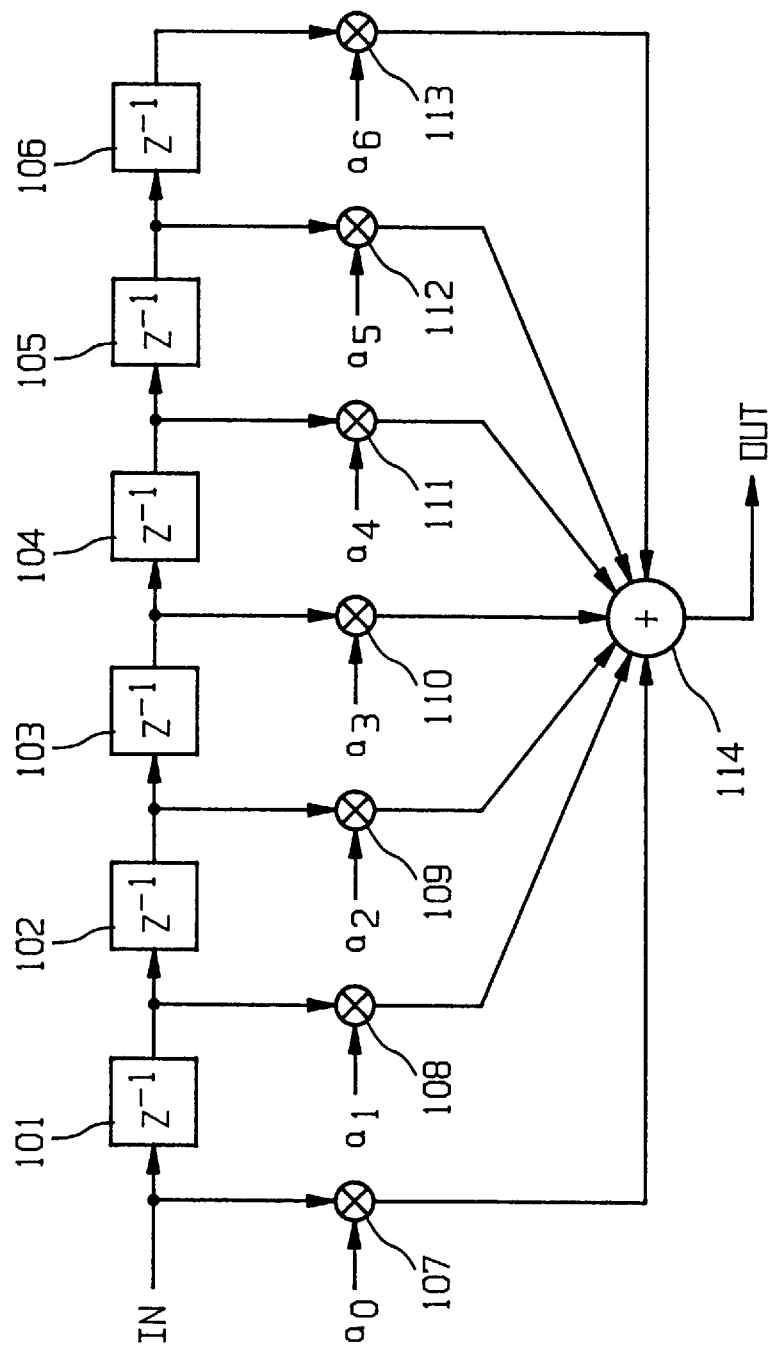
FIG. 1 illustrates a seven-tap finite impulse response (FIR) filtering circuit.

Turning now to the drawings and referring to FIG. 1, a seven-tap finite impulse response (FIR) filtering circuit is shown. The filtering circuit of FIG. 1 can be separated into three main stages: a delay stage, a multiply stage and an accumulate stage. In the delay stage, an input terminal IN first receives an input signal from an external source. The input signal passes through a first delay unit 101, thereby generating a first delayed signal, which is a time delayed version of the input signal. The first delayed signal passes through a second delay unit 102, thereby generating a second delayed signal, which is a time delayed version of the first delayed signal. The second delayed signal passes through a third delay unit 103, thereby generating a third delayed signal, which is a time delayed version of the second delayed signal. The third delayed signal passes through a fourth delay unit 104, thereby generating a fourth delayed signal, which is a time delayed version of the third delayed signal. The fourth delayed signal passes through a fifth delay unit 105, thereby generating a fifth delayed signal, which is a time delayed version of the fourth delayed signal. The fifth delayed signal passes through a sixth delay unit 106, thereby generating a sixth delayed signal, which is a time delayed version of the fifth delayed signal.

In the multiply stage, a first multiplication unit 107 receives the input signal from the input terminal IN, and multiplies the input signal by a first predetermined coefficient $a_0$ to thereby generate a first multiplied signal. A second multiplication unit 108 receives the first delayed signal from the first delay unit 101, and multiplies the first delayed signal by a second predetermined coefficient $a_1$ to thereby generate a second multiplied signal. A third multiplication unit 109 receives the second delayed signal from the second delay unit 102, and multiplies the second delayed signal by a third predetermined coefficient $a_2$ to thereby generate a third multiplied signal. A fourth multiplication unit 110 receives the third delayed signal from the third delay unit 103, and multiplies the third delayed signal by a fourth predetermined coefficient $a_3$ to thereby generate a fourth multiplied signal. A fifth multiplication unit 111 receives the fourth delayed signal from the fourth delay unit 104, and multiplies the fourth delayed signal by a fifth predetermined coefficient $a_4$ to thereby generate a fifth multiplied signal. A sixth multiplication unit 112 receives the fifth delayed signal from the fifth delay unit 105, and multiplies the fifth delayed signal by a sixth predetermined coefficient $a_5$ to thereby generate a sixth multiplied signal. Similarly, a seventh multiplication unit 113 receives the sixth delayed signal from the sixth delay unit 106, and multiplies the sixth delayed signal by a seventh predetermined coefficient $a_6$ to thereby generate a seventh multiplied signal.

Finally, in the accumulate stage of the circuit, an adding unit 114 receives and sums the first through seventh multiplied signals to generate an output signal at an output terminal OUT. Mathematically, the n+1 (i.e., 7) tap filtering circuit of FIG. 1 provides an impulse response, H(z), defined as:

$$H(z) = \sum_{i=0}^{n} a_{[i]} z^{(-i)}$$

As previously indicated, this type of circuit is particularly useful in video sample rate converters. In such an application, it is extremely desirable for the circuit to provide a constant direct current (DC) gain; that is, a constant current gain at 0 hertz. It is also noted that the filtering circuit of FIG. 1 requires a multiplication unit for each tap. From a hardware standpoint, a given one of these multiplication units is not necessarily as easy as another to implement. For example, if six of the seven filter coefficients of FIG. 1 can be expressed as a power of two, and the remaining coefficient can not, it is intuitive that the multiplication operations involving the six "power of two" coefficients are easier to implement from a hardware standpoint than the multiplication operation involving the remaining coefficient since the multiplication operations involving the six "power of two" coefficients can each be implemented through a simple bit shifting process. Clearly, it is desirable for a filtering circuit to be constructed with a minimal amount of hardware.

Figure 2:
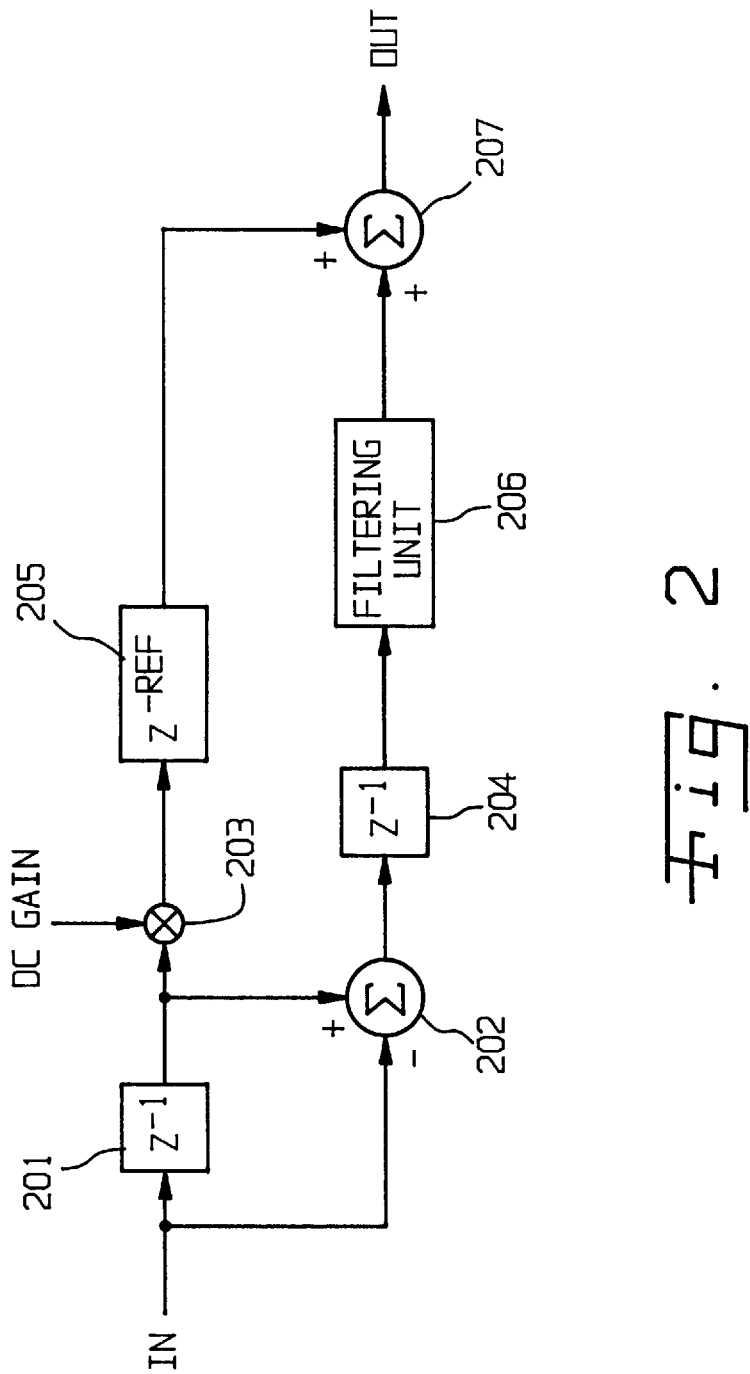
FIG. 2 illustrates a circuit configuration constructed in accordance with the principles of the present invention.

Referring now to FIG. 2, a circuit configuration constructed in accordance with the principles of the present invention is shown. In particular, FIG. 2 illustrates a filtering circuit that is capable of providing the same impulse response characteristics as the filtering circuit of FIG. 1, while ensuring that the direct current (DC) gain is invariant. Moreover, the circuit configuration of FIG. 2 addresses the problem that arises when one of the multiplication operations of the multiply stage requires an extensive amount of hardware. In other words, the circuit of FIG. 2 can be utilized in substitution for the circuit of FIG. 1 in order to provide the foregoing advantages of a constant direct current (DC) gain and reduced hardware requirements. Accordingly, the circuit configuration shown in FIG. 2 is particularly suitable for implementation in a video sample rate converter.

In FIG. 2, an input terminal IN first receives an input signal from an external source. The input signal passes through a first delay unit 201, thereby generating a first delayed signal, which is a time delayed version of the input signal. The input signal also passes to a subtraction unit 202 that subtracts the input signal from the first delayed signal, thereby generating a difference signal. According to an exemplary embodiment, the first delayed signal is multiplied by a predetermined direct current (DC) gain at multiplication unit 203 to generate a multiplied signal. In alternative embodiments, however, this multiplication unit 203 can be interposed either before the input terminal IN, or after the circuit's output terminal OUT. Alternatively, if a direct current (DC) gain of one is desired, the multiplication unit 203 can be eliminated altogether. The difference signal output from subtraction unit 202 passes through a second delay unit 204 to generate a second delayed signal, which is a time delayed version of the difference signal.

When a direct current (DC) gain of one is desired, the first delayed signal output from the first delay unit 201 is transmitted to a reference delay unit 205. Alternatively, when the multiplication unit 203 is utilized as shown in FIG. 2, the multiplied signal output from the multiplication unit 203 passes to the reference delay unit 205. Reference delay unit 205 generates a reference signal by delaying its input signal by an x-unit time period, where x is an integer. In other words, the first and second delay units 201 and 204 each provide a delay equal to a single unit time period, while the reference delay unit 205 provides a delay equal to an integer unit time period that is set by the circuit designer. (Of course, the length of a single unit time period is fixed according to overall design considerations.) Specific considerations govern the designer's selection of the amount of delay provided by the reference delay unit 205. To understand these considerations, it is important to remember that the circuit of FIG. 2 is being provided as an improved substitute for the circuit of FIG. 1. That is, the principles of the present invention enable a circuit designer to begin with a desired filtering circuit having the general configuration shown in FIG. 1 (hereinafter also referred to as the "initial circuit"), and convert that circuit into an improved, equivalent (i.e., same impulse response) circuit having the configuration shown in FIG. 2 (hereinafter also referred to as the "final circuit"). As previously noted, the final circuit will have the same impulse response as the initial circuit, but will ensure a constant direct current (DC) gain and reduce hardware requirements. With these points in mind, if the impulse response characteristics of the initial circuit performs a given multiplication operation (i.e., in the multiply stage) with a coefficient that necessitates the use of an extensive amount of hardware, the tap number corresponding to that multiplication operation should generally be selected as the integer delay period for the reference delay unit 205 in the final circuit. For example, if the third tap of the initial circuit performs a multiply by thirteen operation (e.g., $a_2 = 13/32$), and all of the other taps multiply by numbers that are powers of two, then the reference delay unit 205 of the final circuit should be set to provide a delay of three unit time periods, since the multiply operation for the third tap of the initial circuit would require the most amount of hardware to implement. As a general rule, the circuit designer would want to set the number of delay periods for the reference delay unit 205 in the final circuit equal to the tap number of the initial circuit whose multiplication operation is the most hardware intensive. This tap of the initial circuit can be referred to as the reference tap.

Referring back to FIG. 2, the second delayed signal provided from the second delay unit 204 is input to a filtering unit 206. The specific construction of filtering unit 206 is dependent upon the initial circuit being modeled. Ideally, filtering unit 206 is constructed as an infinite impulse response (IIR) or finite impulse response (FIR) type of filtering circuit. According to at least one preferred embodiment, filtering unit 206 is preferably constructed as a finite impulse response (FIR) filtering circuit having the impulse response, $H(z)$, defined as:

$$H(z) = \sum_{i=0}^{n} a_{[i]} z^{(-i)}$$

Note that the mathematical representation of this exemplary impulse response is the same as the impulse response of the initial circuit of FIG. 1 since the embodiment disclosed herein relates to a finite impulse response (FIR) filtering circuit. It is important to note that the filtering circuit employed as filtering unit 206 in the final circuit of FIG. 2 possesses one less tap than the initial circuit of FIG. 1. The coefficients $a_i$ used in the multiply stage of the filtering unit 206 can be readily determined by accumulatively summing in FIG. 2 the quantity ($z^{-REF}$ minus the initial circuit's desired impulse response). For example, if the impulse response, namely, coefficients $a_0$–$a_6$, of the desired 7-tap initial circuit are:

[−1/32, 0, 13/32, 16/32, 5/32, 0, −1/32], then the direct current (DC) gain is equal to the sum of these coefficients, or one. Assuming the third tap of the initial circuit is the reference tap, the coefficients $a_0$–$a_5$ of the filtering unit 206 can then be determined from the cumulative sum of:

[1/32, 0, 1 13/32, −16/32, −5/32, 0, 1/32], which is:

[1/32, 1/32, 20/32, 4/32, −1/32, −1/32].

Therefore, in this example, the coefficients $a_0$–$a_5$ of the filtering unit 206 would be 1/32, 1/32, 20/32, 4/32, −1/32 and −1/32, respectively.

Utilizing the necessary coefficients, filtering unit 206 generates a filtered signal that is passed to an adding unit 207. Adding unit 207 adds the filtered signal to the reference signal output from reference delay unit 205 to thereby generate an output signal at the circuit's output terminal OUT.

Figure 3:
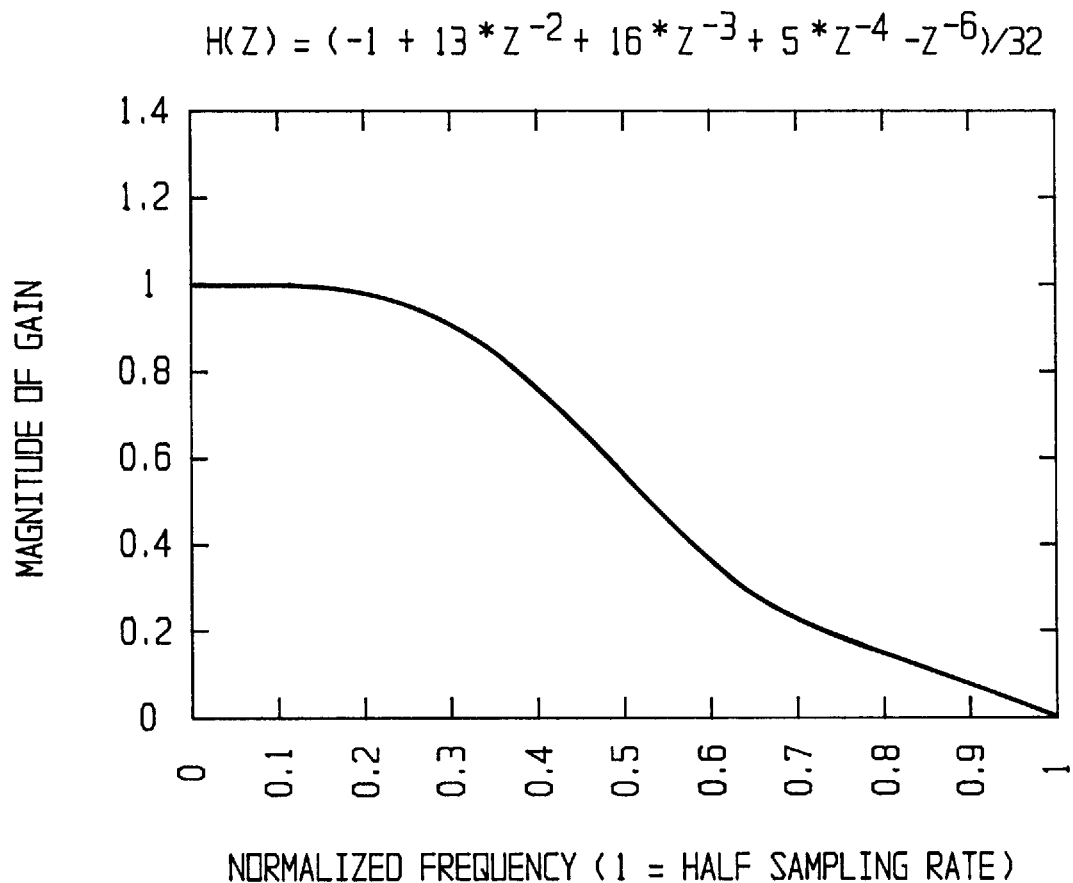
FIG. 3 illustrates an exemplary impulse response for the filtering circuit of FIG. 1 when no realization errors are present.
Figure 4:
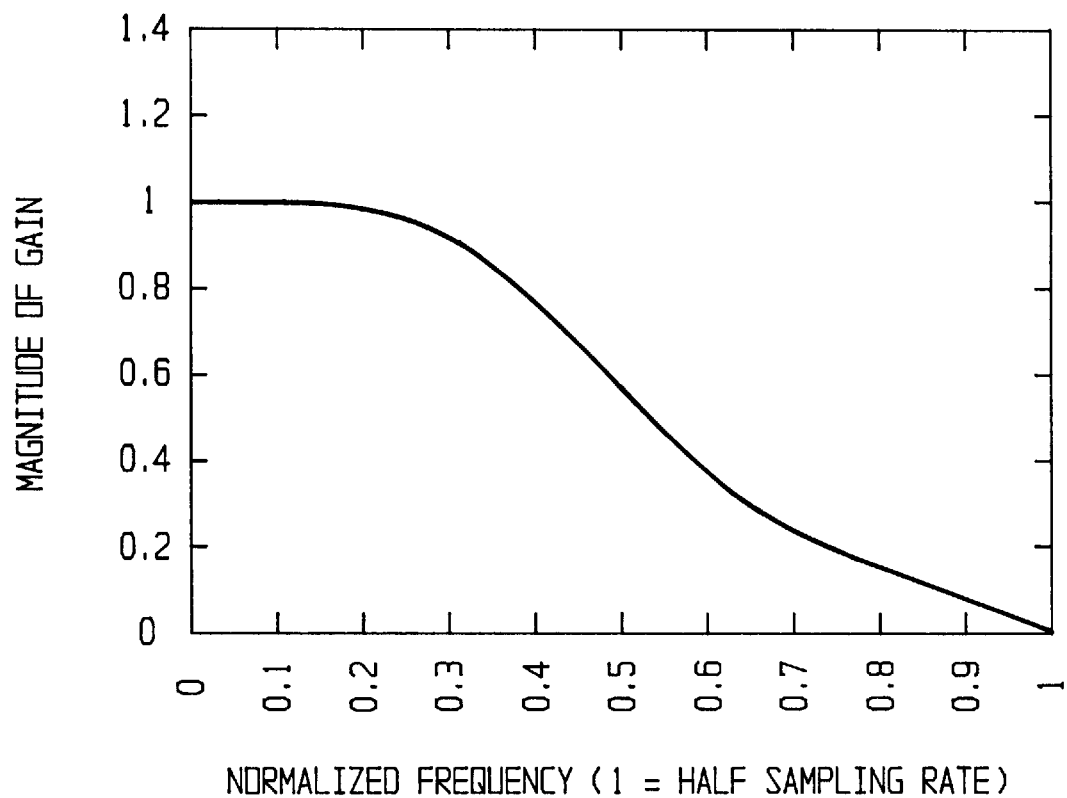
FIG. 4 illustrates an exemplary impulse response for the circuit configuration of FIG. 2 when no realization errors are present.

Referring now to FIGS. 3 through 6, graphical illustrations of the foregoing exemplary impulse responses for the circuits of FIGS. 1 and 2 are shown. These graphs provide a more intuitive understanding of the advantages of the present invention. First, to present the ideal case, FIGS. 3 and 4 respectively illustrate the exemplary impulse responses for the circuits of FIGS. 1 and 2 when no realization errors are present. As shown in FIGS. 3 and 4, a constant direct current (DC) gain is obtained since the gain remains constant at one when the frequency is zero.

Figure 5:
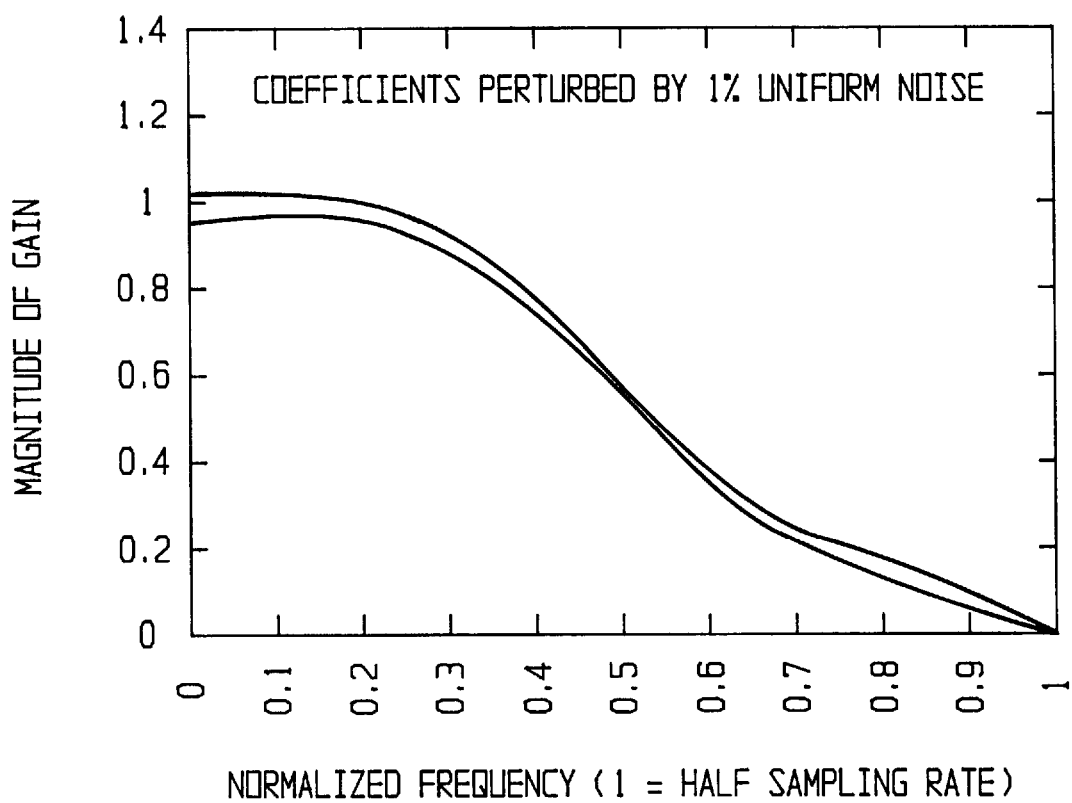
FIG. 5 illustrates the variations in impulse response for the filtering circuit of FIG. 1 when realization errors are present.
Figure 6:
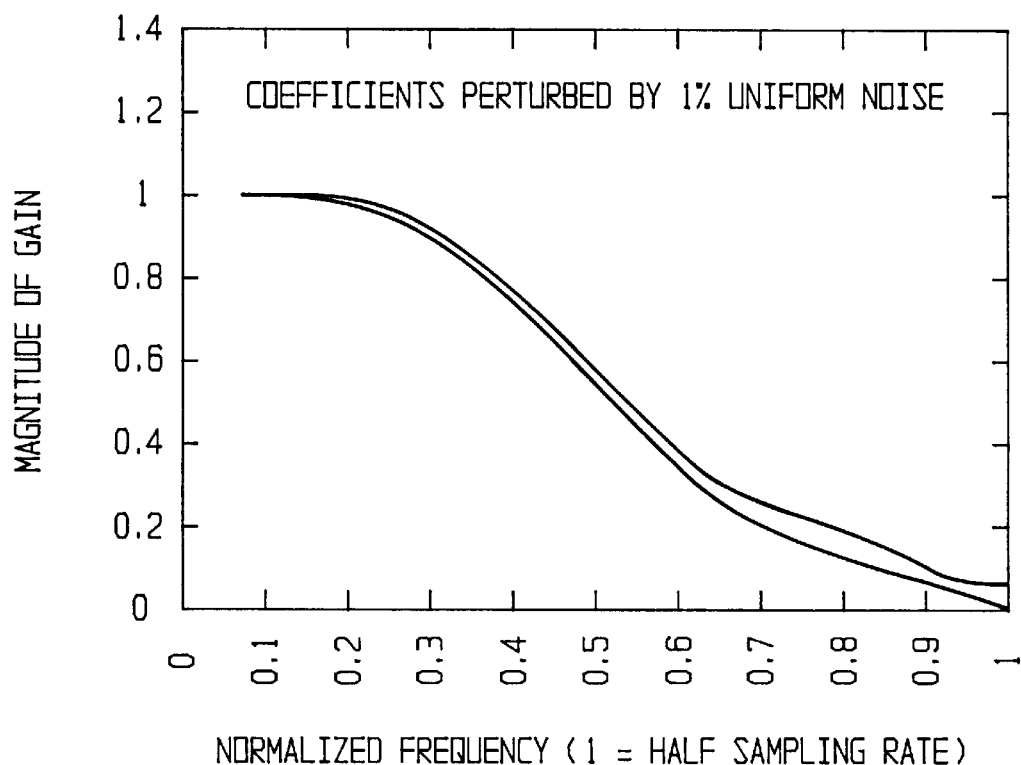
FIG. 6 illustrates the variations in impulse response for the circuit configuration of FIG. 2 when realization errors are present.

FIGS. 5 and 6 respectively illustrate the exemplary impulse responses for the circuits of FIGS. 1 and 2 when realization errors are introduced. In particular, FIGS. 5 and 6 illustrate situations wherein 15 different random perturbations (magnitude equal to 1% of direct current (DC) gain) are made to the filter coefficients (i.e., $a_0$–$a_6$ for FIG. 1, $a_0$–$a_5$ for FIG. 2). As indicated in FIG. 5, these perturbations cause the circuit of FIG. 1 to exhibit significant variations in direct current (DC) gain. Alternatively, as indicated in FIG. 6, these same perturbations produce no changes in direct current (DC) gain in the circuit of FIG. 2. Accordingly, the circuit of FIG. 2 provides a substantial advantage over the circuit of FIG. 1, and is thereby a desirable choice for implementation in a video sample rate converter where direct current (DC) gain variations of −40 dB are readily visible.

As stated in the foregoing disclosure, the present invention provides an improved filtering circuit that ensures a constant direct current (DC) gain independent of realization errors. Accordingly, filtering circuits constructed in accordance with the principles of the present invention serve as an ideal choice for implementing a video sample rate converter.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made without departing from the central scope thereof. Therefore, it is intended that the present invention not be limited to the particular embodiment disclosed as the best mode contemplated for carrying out the invention, but that the present invention includes all embodiments falling within the scope of the appended claims.

What is claimed is:

1. A circuit, comprising:
   an input terminal for receiving an input signal;
   a first delay unit for delaying the input signal to generate a first delayed signal;
   a subtracting unit for subtracting the input signal from the first delayed signal to generate a difference signal;
   a second delay unit for delaying the difference signal to generate a second delayed signal;
   a reference delay unit for delaying the first delayed signal by a predetermined reference time period to generate a reference signal;
   a filtering unit for filtering the second delayed signal to generate a filtered signal; and
   an adding unit for adding the reference signal to the filtered signal to generate an output signal.

2. The circuit as claimed in claim 1, further comprising a multiplication unit for multiplying one of the first delayed signal, the input signal and the output signal by a predetermined constant to obtain a desired direct current (DC) gain.

3. The circuit as claimed in claim 1, wherein the filtering unit comprises a finite impulse response filter.

4. The circuit as claimed in claim 1, wherein the filtering unit comprises an infinite impulse response filter.

5. The circuit as claimed in claim 1, wherein the circuit is embodied in a video sample rate converter.

6. The circuit as claimed in claim 1, wherein the circuit provides a constant direct current (DC) gain.

7. A filtering method, comprising the steps of:

receiving an input signal;

delaying the input signal to generate a first delayed signal;

subtracting the input signal from the first delayed signal to generate a difference signal;

delaying the difference signal to generate a second delayed signal;

delaying the first delayed signal by a predetermined reference time period to generate a reference signal;

filtering the second delayed signal to generate a filtered signal; and adding the reference signal to the filtered signal to generate an output signal.

8. The filtering method as claimed in claim 7, further comprising a step of multiplying one of the first delayed signal, the input signal and the output signal by a predetermined constant to obtain a desired direct current (DC) gain.

\* \* \* \* \*